(12) United States Patent
Miyagawa et al.

(10) Patent No.: US 11,975,650 B2
(45) Date of Patent: May 7, 2024

(54) DETACHABLE FOG LIGHT UNIT

(71) Applicant: Honda Motor Co., Ltd., Tokyo (JP)

(72) Inventors: Shinobu Miyagawa, Tokyo (JP); Takahiro Matsumoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/123,113

(22) Filed: Mar. 17, 2023

(65) Prior Publication Data
US 2023/0311745 A1    Oct. 5, 2023

(30) Foreign Application Priority Data

Mar. 29, 2022   (JP) .................................. 2022-052937

(51) Int. Cl.
*B60Q 1/20* (2006.01)
*B60Q 1/00* (2006.01)

(52) U.S. Cl.
CPC ............. *B60Q 1/20* (2013.01); *B60Q 1/0076* (2013.01); *B60Q 1/0094* (2013.01)

(58) Field of Classification Search
CPC ....... B60Q 1/20; B60Q 1/0076; B60Q 1/0094
See application file for complete search history.

(56) References Cited

U.S. PATENT DOCUMENTS

| | | | |
|---|---|---|---|
| 7,780,321 B1* | 8/2010 | Retief | ...................... B62J 6/029 362/474 |
| 2005/0067203 A1 | 3/2005 | Uno | |
| 2006/0226344 A1* | 10/2006 | Werth | ..................... B60Q 1/245 250/214 VT |
| 2007/0109803 A1* | 5/2007 | Chuang | ..................... B62J 6/029 362/473 |
| 2010/0246199 A1* | 9/2010 | Ma | ........................... B62J 45/20 362/474 |

(Continued)

FOREIGN PATENT DOCUMENTS

| | | |
|---|---|---|
| JP | 61-139535 A | 6/1986 |
| JP | 2005-104258 A | 4/2005 |

(Continued)

OTHER PUBLICATIONS

Japanese Notice of Reasons for Refusal for Japanese Application No. 2022-052937, dated Jan. 9, 2024, with an English translation.

*Primary Examiner* — Tracie Y Green
*Assistant Examiner* — Michael Chiang
(74) *Attorney, Agent, or Firm* — Birch, Stewart, Kolasch & Birch, LLP

(57) ABSTRACT

Provided is a fog light unit of a vehicle that facilitates attachment and detachment of a light section attached to the vehicle body and is excellent in operability of the portable light. A fog light unit includes a base fixed to a body of the saddle vehicle and a light section that is detachable from the base. The light section has a built-in battery. The base and the light section are connected with a slide mechanism including a guide rail and an engaging portion that slides along the guide rail for engagement. The fog light unit further includes a lock mechanism configured to prohibit a slide motion of the slide mechanism, and the lock mechanism includes a lock pin that protrudes and retracts, and an engagement hole, with which the lock pin engages.

17 Claims, 9 Drawing Sheets

(56) References Cited

U.S. PATENT DOCUMENTS

| | | | | |
|---|---|---|---|---|
| 2010/0271814 A1* | 10/2010 | Messinger | .............. | F21L 4/005 |
| | | | | 362/183 |
| 2011/0261556 A1* | 10/2011 | Gibson | ................ | F21V 21/084 |
| | | | | 362/105 |
| 2012/0218771 A1* | 8/2012 | Yen | .......................... | B62J 6/029 |
| | | | | 362/473 |
| 2017/0203802 A1* | 7/2017 | Zhao | .......................... | B62J 6/01 |
| 2018/0111654 A1* | 4/2018 | Emerson | .................... | B62J 6/03 |
| 2019/0039670 A1* | 2/2019 | Tsao | ........................ | B62J 6/015 |
| 2019/0382067 A1* | 12/2019 | Mühle | ..................... | B62M 6/90 |
| 2020/0010136 A1* | 1/2020 | Yun | ..................... | H05B 47/115 |
| 2021/0039737 A1* | 2/2021 | Montez | ................. | H04N 23/90 |

FOREIGN PATENT DOCUMENTS

| | | |
|---|---|---|
| JP | 2006-308919 A | 11/2006 |
| JP | 2016-81012 A | 4/2015 |

\* cited by examiner

DETACHABLE FOG LIGHT UNIT

BACKGROUND

1. Technical Field

The present invention relates to fog light units, and more particularly to a fog light unit of a vehicle, and the fog light unit can be used as a portable light by detaching its light section from the vehicle body.

2. Description of the Background

Conventionally, a vehicle has been known, which includes a built-in battery in a light unit serving as the lighting device of the vehicle body, and the light section of the light unit can be detached from the vehicle body to be used as a portable light.

Patent Literature 1 discloses a configuration of a motorcycle having a built-in battery in the headlight, which can be detached from the vehicle body.

CITATION LIST

Patent Literature

Patent Literature 1 JP S61-139535 A

BRIEF SUMMARY

The configuration of Patent Literature 1, however, has a large headlight fixed to the vehicle body with bolts, and also requires removal of the coupler for power supply when detaching the headlight. The attachment and detachment of the headlight is therefore troublesome, and the configuration requires some improvement in the operability of the portable light.

To solve the above problems of the conventional technology, the present invention aims to provide a fog light unit of a vehicle that facilitates attachment and detachment of a light section attached to the vehicle body and is excellent in operability of the portable light.

To achieve the above aim, according to a first aspect of the present invention, a fog light unit (20) is to be attached to a saddled vehicle (1). The fog light unit (20) includes a base (21) fixed to a body of the saddle vehicle (1) and a light section (22) that is detachable from the base (21). The light section (22) has a built-in battery (102). The base (21) and the light section (22) are connected with a slide mechanism (60) including a guide rail (44) and an engaging portion (34) that slides along the guide rail (44) for engagement.

According to a second aspect, the fog light unit further includes a lock mechanism configured to prohibit a slide motion of the slide mechanism (60). The lock mechanism includes a lock pin (35) that protrudes and retracts, and an engagement hole (46), with which the lock pin (35) engages.

According to a third aspect, the fog light unit further includes terminals for light section (55, 56, 57) that lead to the built-in battery (102) and a controller (100) that the light section (22) includes, and terminals for base (45) disposed at the base (21). Engagement between the guide rail (44) and the engaging portion (34) brings the terminals for light section (55, 56, 57) in contact with the terminals for base (45).

According to a fourth aspect, the lock pin (35) is disposed at any of the light section (22) and the base (21), and the lock pin (35) is located outside a region surrounded by the terminals for light section (55, 56, 57) or outside a region surrounded by the terminals for base (45).

According to a fifth aspect, the light section (22) includes a switch (31) to switch on and off a light emitting portion (32).

According to a sixth aspect, while the light section (22) is connected to the base (21), the vehicle body of the saddle vehicle (1) has priority for lighting control of the light section (22).

According to a seventh aspect, the fog light unit further includes a cover (51) that covers the slide mechanism (60) after the light section (22) is detached from the base (21).

According to an eighth aspect, the built-in battery (102) of the light section (22) is configured to be charged by power supply from a vehicle body battery (90) when the light section (22) is attached to the base (21), and charging voltage is lowered when a charge rate of the built-in battery (102) exceeds a predetermined value.

According to the first aspect, a fog light unit (20) is to be attached to a saddled vehicle (1), and the fog light unit (20) includes a base (21) fixed to a body of the saddle vehicle (1) and a light section (22) that is detachable from the base (21). The light section (22) has a built-in battery (102). The base (21) and the light section (22) are connected with a slide mechanism (60) including a guide rail (44) and an engaging portion (34) that slides along the guide rail (44) for engagement. Thus, the first aspect uses the fog light smaller than the headlight for portable light, and facilitates attachment and detachment of the light section due to the slide mechanism, thus enhancing the operability of the light section as a portable light.

According to the second aspect, the fog light unit further includes a lock mechanism configured to prohibit a slide motion of the slide mechanism (60). The lock mechanism includes a lock pin (35) that protrudes and retracts, and an engagement hole (46), with which the lock pin (35) engages. The lock mechanism of a simple structure prevents the light section from coming off the base while driving or prevents another person from removing the light section.

According to the third aspect, the fog light unit further includes terminals for light section (55, 56, 57) that lead to the built-in battery (102) and a controller (100) that the light section (22) includes, and terminals for base (45) disposed at the base (21). Engagement between the guide rail (44) and the engaging portion (34) brings the terminals for light section (55, 56, 57) in contact with the terminals for base (45). A single operation of attaching the light section to the base connects these terminals.

According to the fourth aspect, the lock pin (35) is disposed at any of the light section (22) and the base (21), and the lock pin (35) is located outside a region surrounded by the terminals for light section (55, 56, 57) or outside a region surrounded by the terminals for base (45). This configuration prevents leakage current from occurring between the terminals via the lock pin.

According to the fifth aspect, the light section (22) includes a switch (31) to switch on and off a light emitting portion (32). This configuration allows a user to turn on the light section detached from the base at a timing intended by the user, thereby enhancing the convenience as the portable light.

According to the sixth aspect, while the light section (22) is connected to the base (21), the vehicle body of the saddle vehicle (1) has priority for lighting control of the light section (22). While the light section is attached to the base, lighting can be controlled with a switch or the like operated by the driver in the same manner as a typical fog light.

According to the seventh aspect, the fog light unit further includes a cover (51) that covers the slide mechanism (60) after the light section (22) is detached from the base (21). The cover protects the guide rails and terminals exposed to the outside.

According to the eighth aspect, the built-in battery (102) of the light section (22) is configured to be charged by power supply from a vehicle body battery (90) when the light section (22) is attached to the base (21), and charging voltage is lowered when a charge rate of the built-in battery (102) exceeds a predetermined value. This reduces the load on the vehicle-body battery.

DETAILED DESCRIPTION

Figure 1:
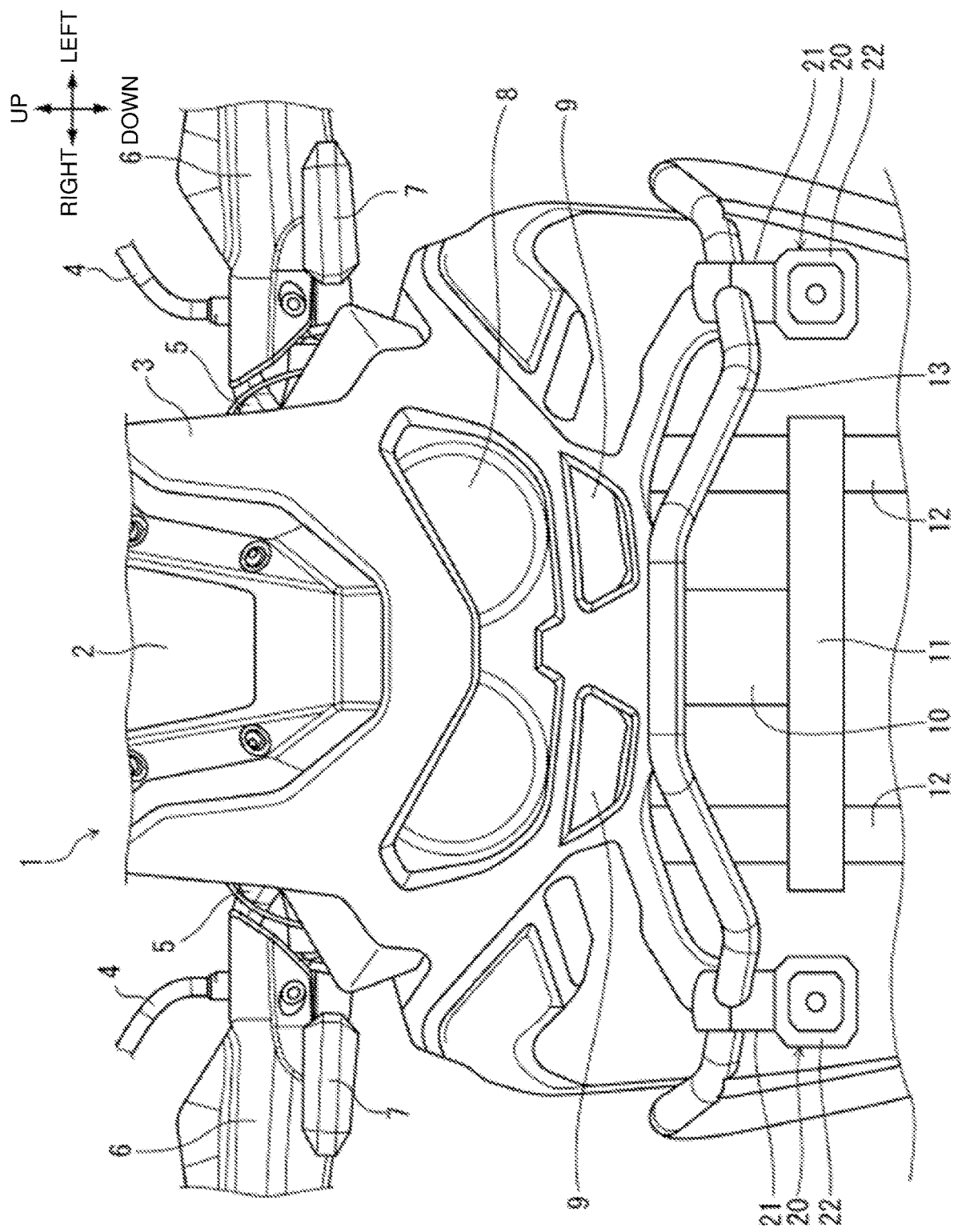
FIG. 1 is a partially enlarged front view of a motorcycle, to which a fog light unit according to the present embodiment is applied.

The following describes a preferred embodiment of the present invention in details with reference to the drawings. FIG. 1 is a partially enlarged front view of a motorcycle 1, to which a fog light unit 20 according to the present embodiment is applied. The motorcycle 1 has a head pipe 10 at the front end of the body frame. A bottom bridge 11 supporting a pair of left and right front forks 12 is placed at the lower part of the head pipe 10. A top bridge (not shown) is placed at an upper part of the head pipe 10, and a steering handle 5 supporting a pair of left and right rearview mirrors 4 and a knuckle guard 6 is fixed to this top bridge. A front cowl 3 is placed in front of the head pipe 10, and the front cowl 3 supports a windbreak screen 2, a headlight 8 and a pair of left and right cornering lights 9. A pair of left and right front flasher lamps 7 is placed between the steering handle 5 and the front cowl 3.

A guard pipe 13 is placed from the front and side of the front cowls 3 to protect the vehicle body. A pair of left and right fog light units 20 according to the present embodiment is attached to the guard pipe 13. Each fog light unit 20 includes a base 21 to fix it to the guard pipe 13 and a light section 22 detachable from the base 21. The light section 22 has a built-in battery and is detachable from the base 21 to be used as a portable light.

Figure 2:
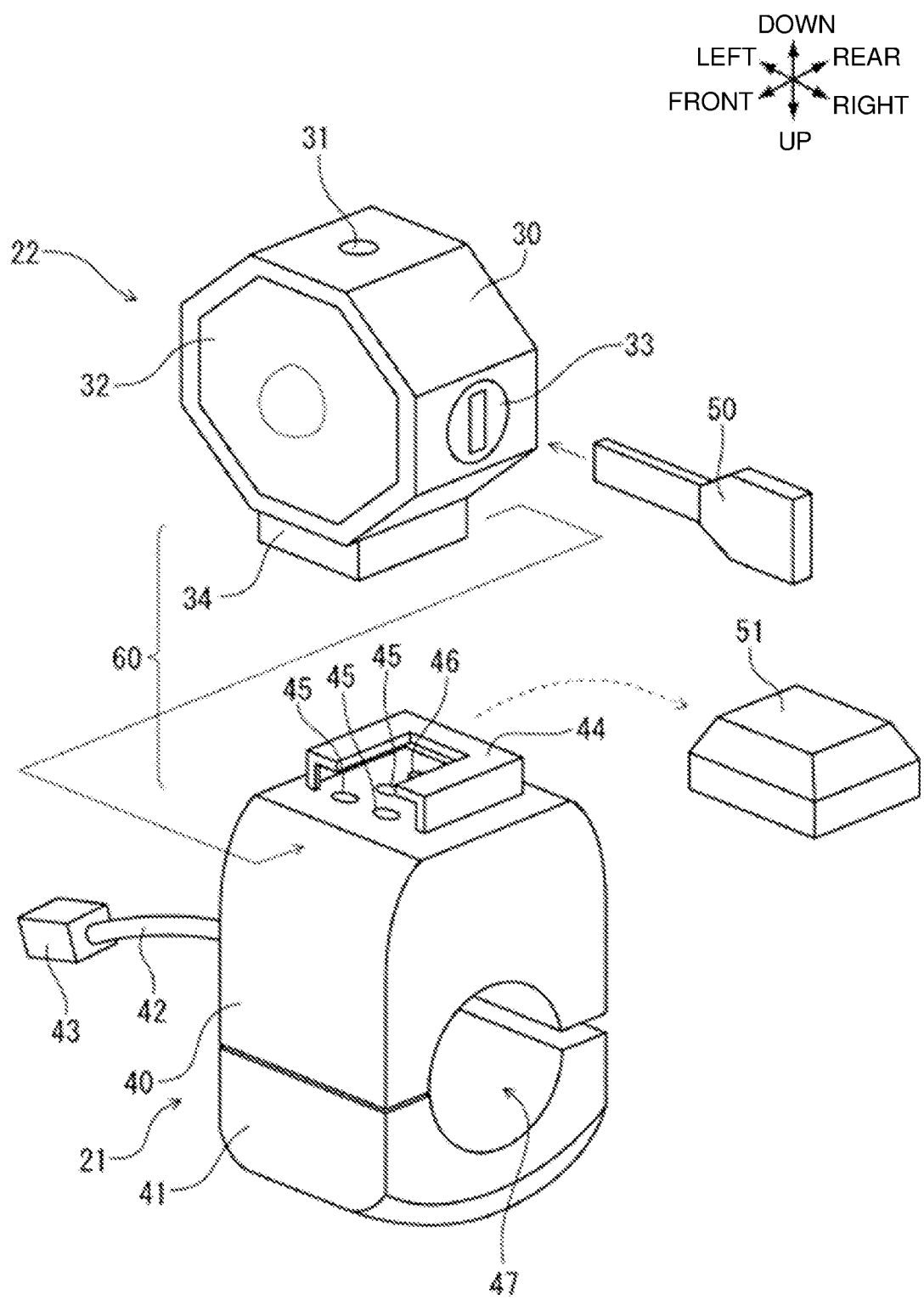
FIG. 2 is a perspective view of the fog light unit.
Figure 3:
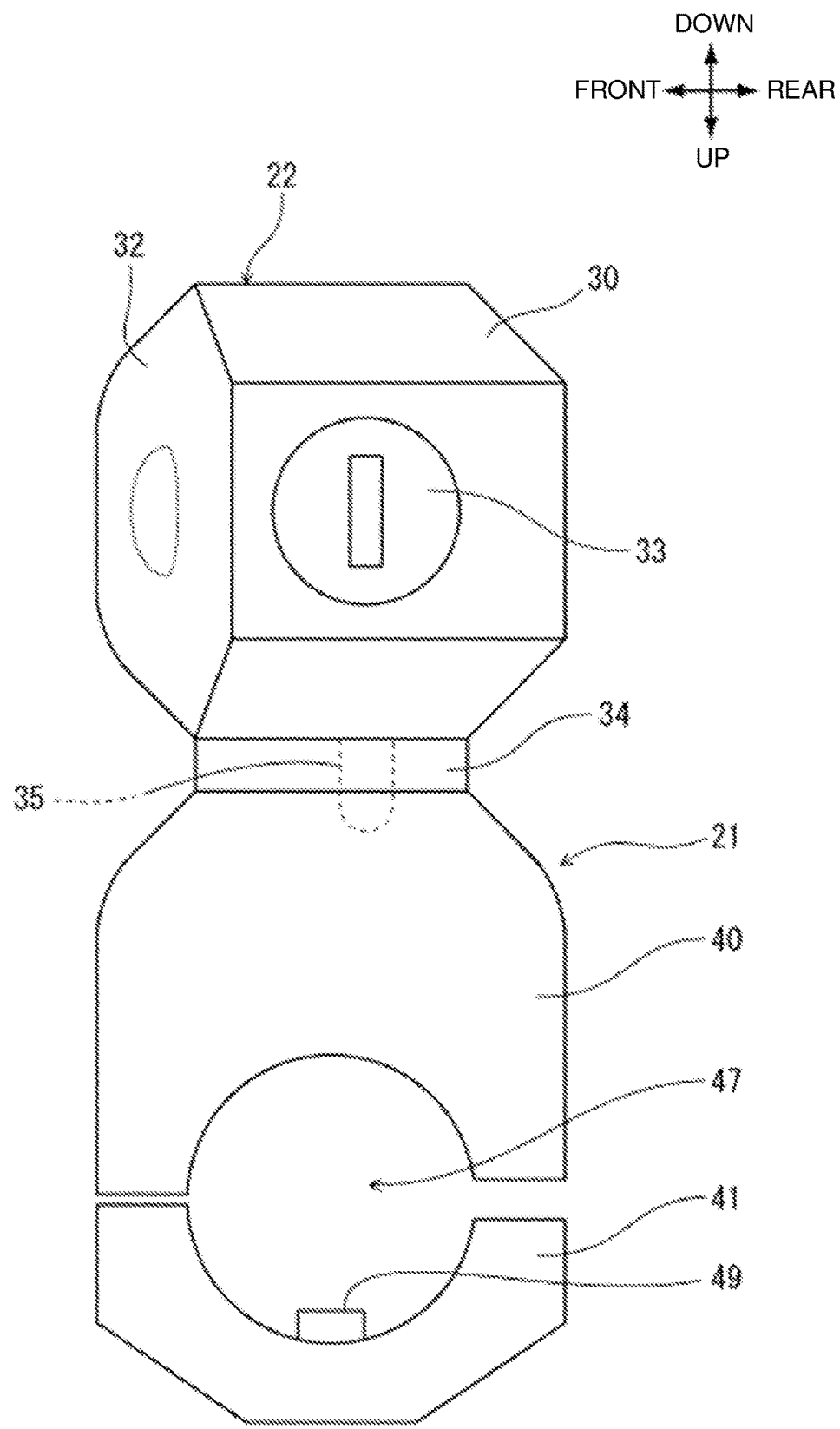
FIG. 3 is a side view of the fog light unit.
Figure 4:
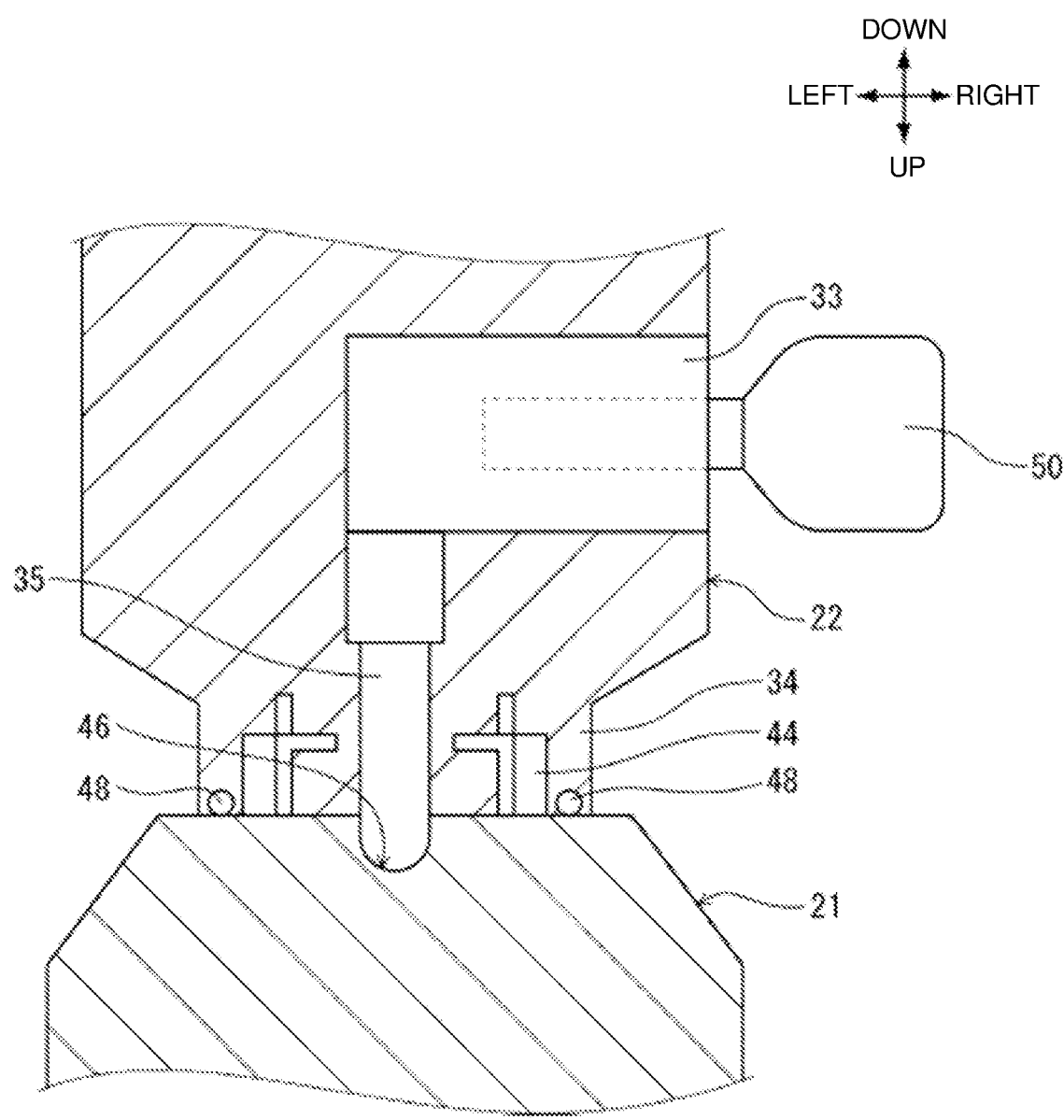
FIG. 4 is a cross-sectional view showing the configuration of a slide mechanism.

FIG. 2 is a perspective view of the fog light unit 20. FIG. 3 is a side view of the fog light unit 20, and FIG. 4 is a cross-sectional view showing the configuration of its slide mechanism 60. The left and right fog light units 20 have the same structure, and FIGS. 2 to 6 describe the fog light unit 20 on the left in the vehicle width direction. When attaching the fog light unit 20 to the vehicle body, the light section 22 may be placed below the base 21 as shown in FIG. 1, or the light section 22 may be placed above the base 21 as shown in FIGS. 2 and 3.

The slide mechanism 60 allows the base 21 and light section 22 to be detachably attachable to each other, and includes a guide rail 44 on the base 21 and an engaging portion 34 on the light section 22. This slide mechanism 60 allows the light section 22 to be easily attached to and detached from the base 21 without the use of fasteners or tools.

The light section 22 has a body 30 that includes a light emitting portion 32, an on/off switch 31, a key cylinder 33, and the engaging portion 34 of the slide mechanism 60. The on/off switch 31 allows a user to turn on the light section 22 detached from the base 21 at a timing intended by the user, thereby enhancing the convenience as the portable light. The key cylinder 33 rotates with a key 50 and is connected to an operating mechanism for a lock pin 35.

The base 21 includes an upper half 40 and a lower half 41 that are connected to each other by a fastener. The upper half 40 and the lower half 41 define a clamp hole 47 therebetween to fix the base 21 to the guard pipe 13, and the lower half 41 has a positioning pin 49 on the inner periphery.

The base 21 has a guide rail 44 of the slide mechanism 60 on the upper surface. The engaging portion 34 of the light section 22 slides along the guide rail 44 for engagement. The guide rail 44 has a substantially L-shaped cross section and has a substantially U shape with one side open in plan view. The base 21 has three terminals for base 45 and an engagement hole 46 in the region of the upper surface surrounded by the guide rail 44. The engagement hole 46 engages with the lock pin 35 that extends downward from the light section 22. A harness 42 is connected to the upper half 40 to supply electric power to the light section 22 and to transmit an on/off signal from the vehicle body, and the harness 42 has a coupler 43 at the end to connect to the vehicle body.

The lock pin 35 of the light section 22 and the engagement hole 46 of the base 21 make up a lock mechanism that prohibits the slide motion of the light section 22. The user operates the key cylinder 33 of the light section 22 attached to the base 21 so as to engage the lock pin 35 with the engagement hole 46. This operation prohibits the slide motion of the light section 22. This prevents the light section 22 from coming off the base 21 while driving or prevents another person from removing the light section 22.

A seal member 48 intervenes at the joint face between the base 21 and the light section 22 to prevent entry of moisture, dust, and others. After detaching the light section 22 from the base 21, a protective cap 51 may be attached to the guide rail 44. A similar protective cap or a sliding protective cover may be attached also to the engaging portion 34.

Figure 5:
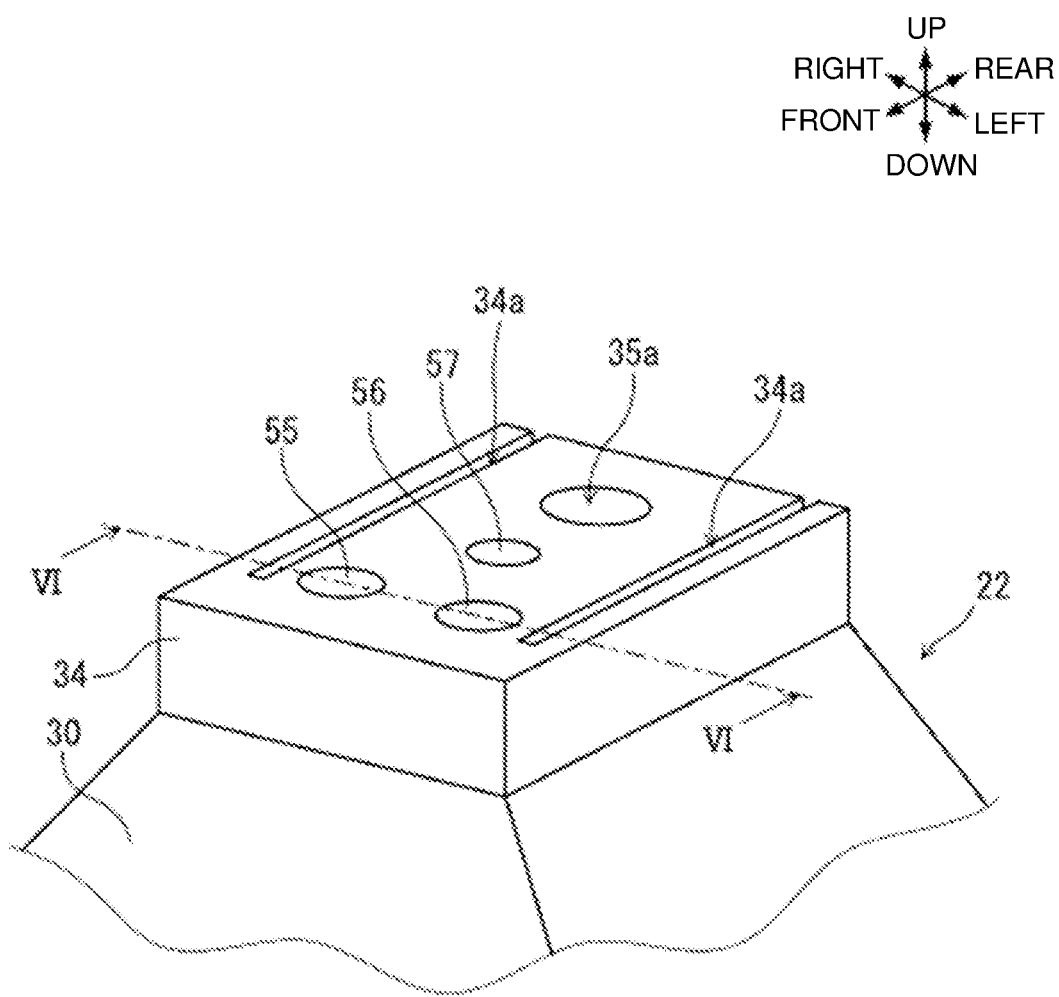
FIG. 5 is a perspective view showing the configuration of an engaging portion of the light section.

FIG. 5 is a perspective view showing the configuration of the engaging portion 34 of the light section 22. The engaging portion 34 has two grooves 34a for engagement, with which the guide rail 44 engages. A first terminal 55, a second terminal 56, and a third terminal 57 to come in contact with the terminals for base 45 of the base 21 are placed between the two grooves 34a. In this embodiment, the first terminal 55 is for switching, the second terminal 56 is for charging, and the third terminal 57 is for grounding, and these terminals make up the terminals for light section.

These first terminal 55, second terminal 56, and third terminal 57 are arranged in a triangular shape, and a hole 35a for letting the lock pin 35 protrude or retract is placed outside the triangular region. This prevents leakage current from occurring between the terminals via the lock pin 35.

Figure 6:
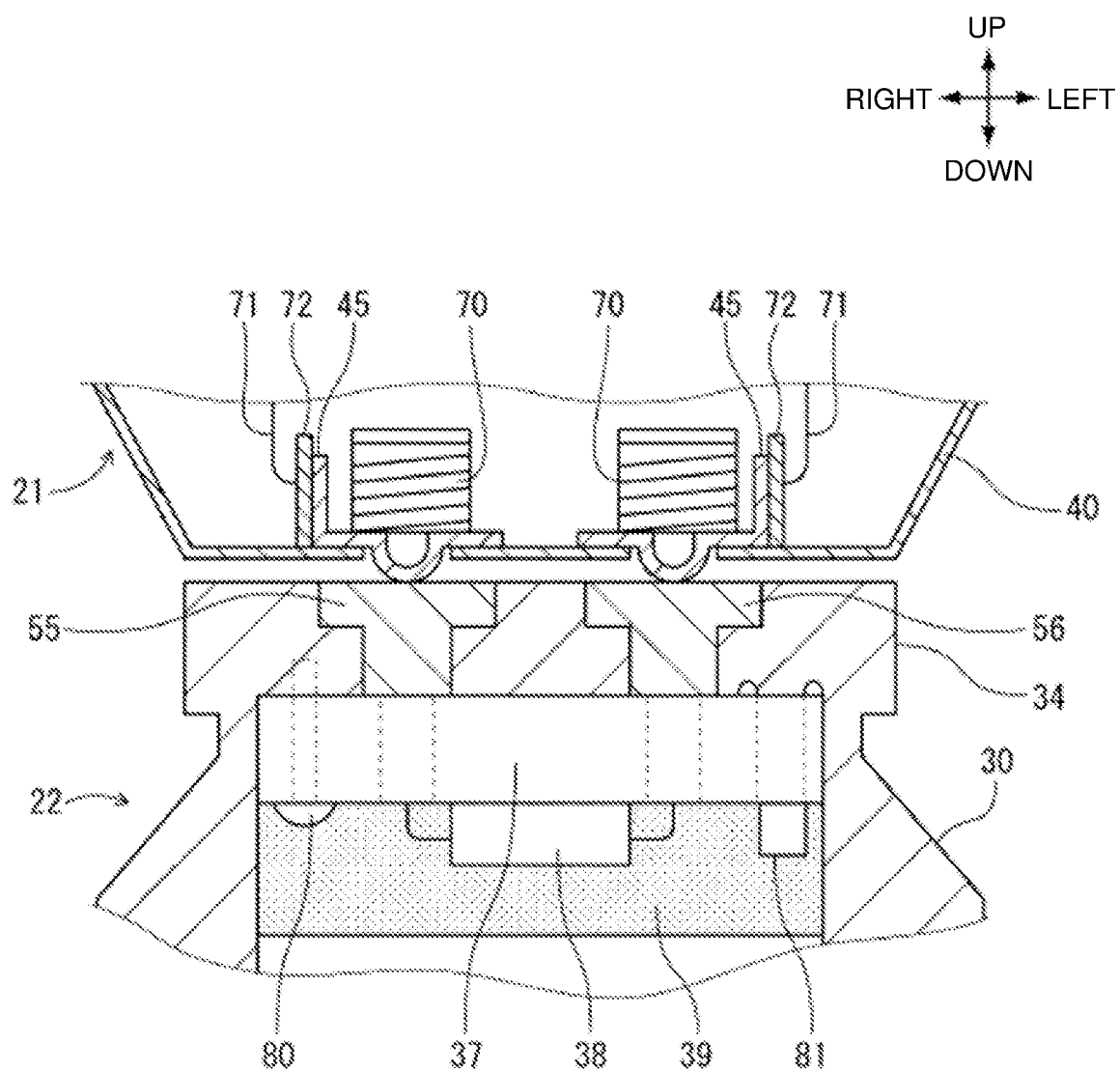
FIG. 6 is a cross-sectional view along the line VI-VI of FIG. 5.

FIG. 6 is a cross-sectional view along the line VI-VI of FIG. 5. This drawing also shows a cross section of the base 21 placed above the light section 22. The first terminal 55 and second terminal 56 of the light section 22 are mounted on one face of a substrate 37. The substrate 37 is positioned by a positioning boss 81 and fixed to the body 30 with a screw 80. A microcomputer 38 is mounted on the other face of the substrate 30, and potting with synthetic resin 39 is provided around the microcomputer 38 to achieve dust-proof and anti-vibration effects.

The terminals for base 45 protrude downward through openings of the base 21, and are each in contact with a support contact 72 fixed to the base 21 so as to be slidable vertically, and are each biased downward in the drawing by a bias member 70. This keeps enough contact pressure with the first terminal 55, second terminal 56, and third terminal 57 to enhance the reliability of the electrical connection. Wiring 71 is connected to each support contact 72. The terminal-to-terminal contact structure described above eliminates a wiring connection between the base 21 and the light section 22, and thus facilitates the attachment/detachment of the light section 22.

Figure 7:
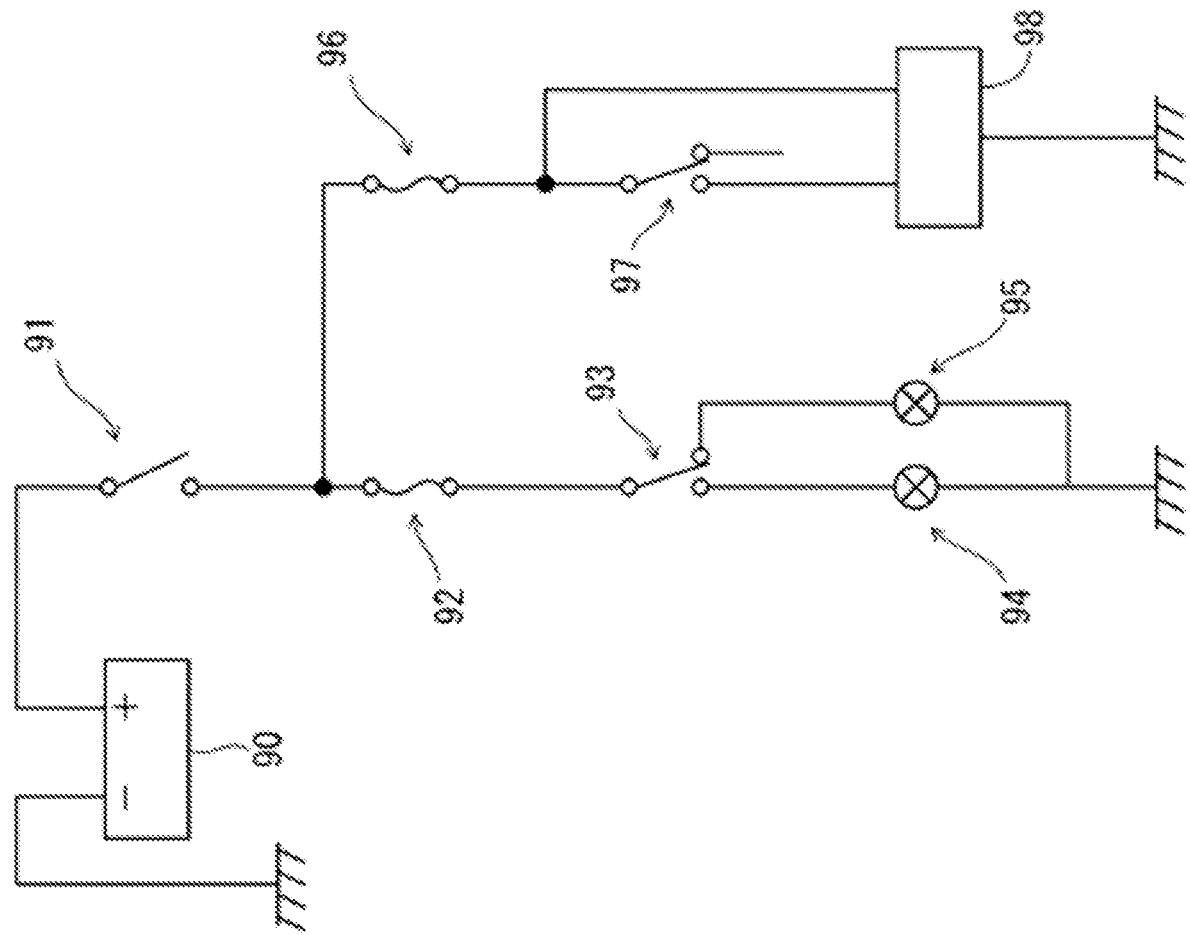
FIG. 7 is an electrical circuit diagram of the light system of the motorcycle.

FIG. 7 is an electrical circuit diagram of the light system of the motorcycle 1. A main switch 91 is located downstream of a vehicle-body battery 90. A dimmer switch 93 is located downstream of the main switch 91 and downstream of a first fuse 92, and the dimmer switch 93 switches the power supply between to a low-beam light source 94 and to a high-beam light source 95 of the headlight 8. A vehicle-body switch 97 is located downstream of a second fuse 96, and the vehicle-body switch 97 switches on and off of the fog light unit 20 when the fog light unit is attached to the vehicle body. A charging circuit 98 charges the built-in battery (see FIG. 8) of the light section 22, and supplies power to the built-in battery only while the main switch 91 is on.

Figure 8:
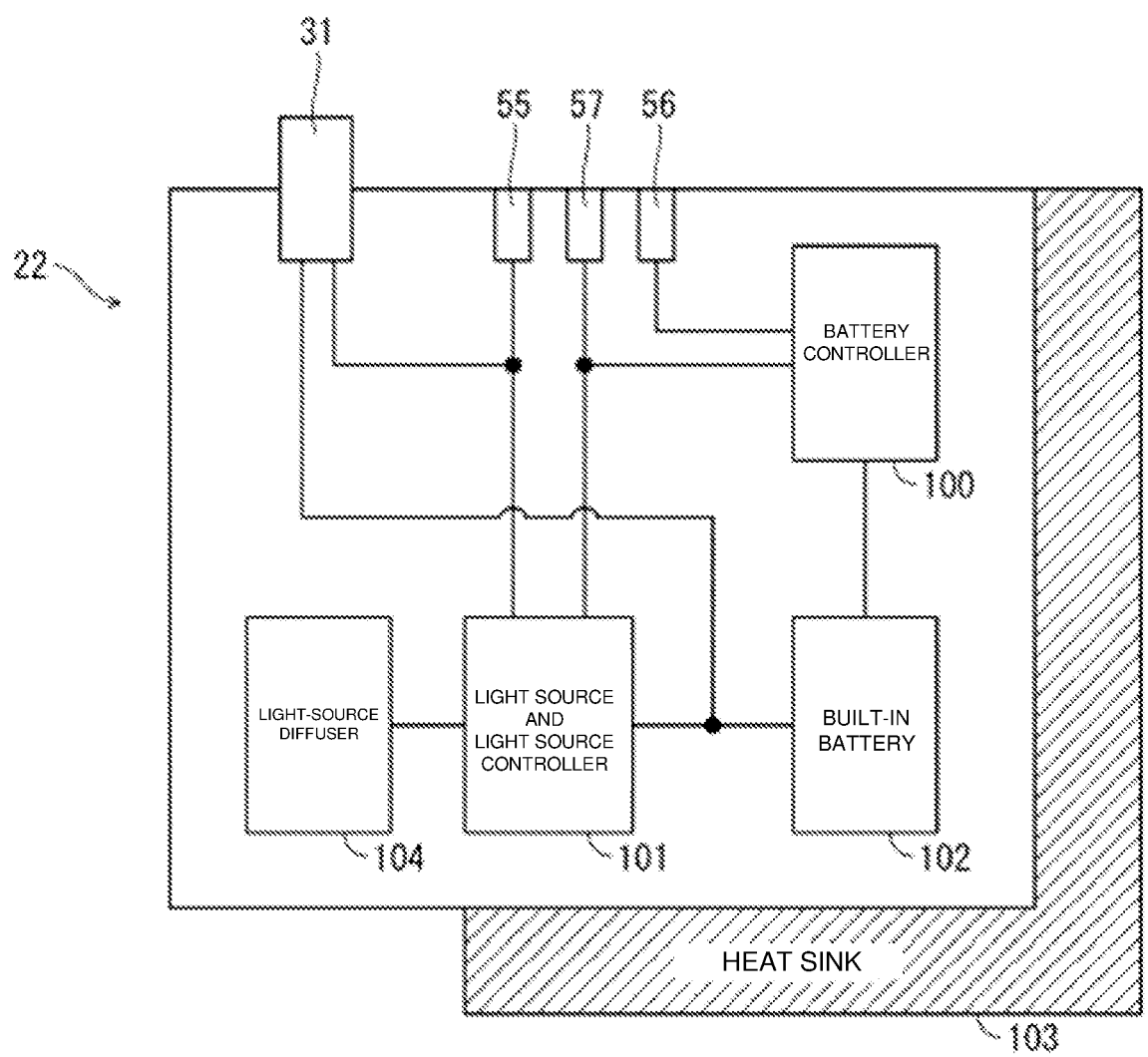
FIG. 8 is a block diagram showing the internal structure of the light section.

FIG. 8 is a block diagram showing the internal structure of the light section 22. As described above, the light section 22 has the on/off switch 31, the first terminal 55, the second terminal 56, and the third terminal 57. The light section 22 also has a battery controller 100, a built-in battery 102, a light source and light source controller 101, and a light-source diffuser 103. The battery controller 100 controls charging and discharging of the built-in battery 102, and receives power from the vehicle body via the second terminal 56. The light source and light source controller 101 include a light emitting diode (LED) and a LED driver, and the light-source diffuser 104 includes a projector lens or a multi-reflector lens. The battery controller 100, light source and light source controller 101, and built-in battery 102 are placed so as to be cooled by a heat sink 103.

Figure 9:
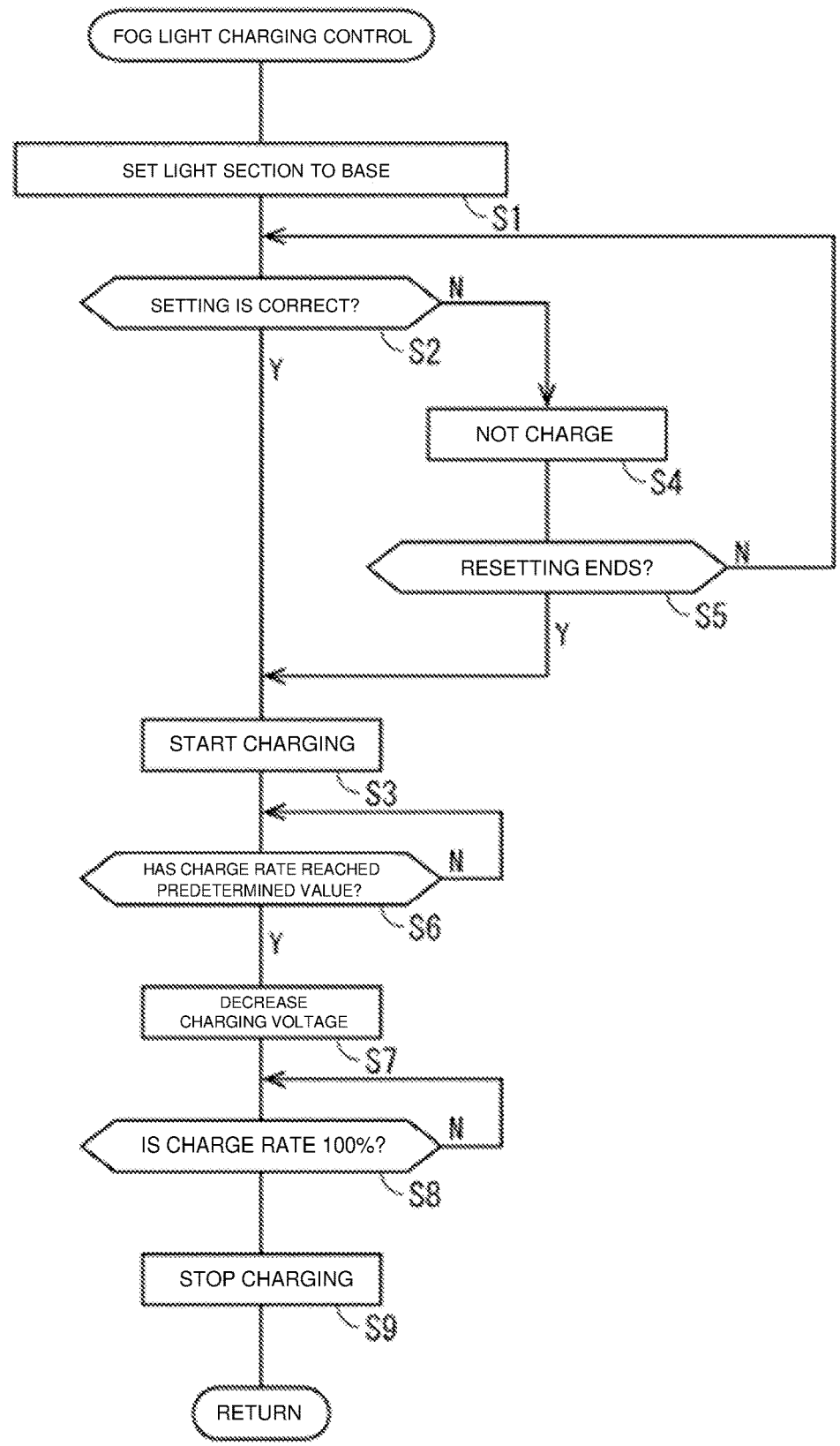
FIG. 9 is a flowchart showing the procedure of fog light charging control according to the present embodiment.

FIG. 9 is a flowchart showing the procedure of fog light charging control according to the present embodiment. In step S1, the user sets the light section 22 to the base 21 using the slide mechanism 60. In the next step S2, determination is made whether or not the setting is correct, and if the determination is positive, the procedure proceeds to step S3 to start charging of the built-in battery 102.

If the determination is negative in step S2, the procedure proceeds to step S4, and suspends the starting of charging, and in step S5, determination is made whether or not re-setting of the light section 22 ends. If the determination is positive in step S5, the procedure proceeds to step S3 to start charging. If the determination is negative in step S5, the procedure returns to the determination in step S2.

In step S6, determination is made whether or not the charging rate of the built-in battery 102 has reached a predetermined value (e.g., 90%). If the determination is positive in step S6, the procedure proceeds to step S7 to decrease the charging voltage. This reduces the load on the vehicle-body battery 90. If the determination is positive in step S7, the procedure returns to the determination in step S6. In the next step S8, determination is made whether or not the charging rate of the built-in battery 102 has reached 100%, and if the determination is positive, the procedure proceeds to step S9 to stop charging and ends the series of control. If the determination is negative in step S8, the procedure returns to the determination in step S8.

As described above, according to the fog light unit 20 of the present invention, the fog light unit 20 includes the base 21 fixed to the vehicle body and the light section 22 detachable from the base 21, and the base 21 and the light section 22 are connected by the slide mechanism 60 that includes the guide rail 44 and the engaging portion 34 that slides along the guide rail 44 for engagement. Thus, the present embodiment uses the fog light smaller than the headlight for portable light, and facilitates attachment and detachment of the light section 22 due to the slide mechanism, thus enhancing the operability of the light section 22 as a portable light.

The form of the motorcycle, the mounting position and number of the fog light unit(s), the shape and structure of the fog light unit(s), the shape and structure of the slide mechanism, the arrangement of terminals and the structure of the lock mechanism are not limited to those of the above embodiment, and they may be changed variously. For instance, for the slide mechanism, the light section may include the guide rail, and the base may include the engaging portion. The base may include the lock pin. The fog light unit according to the present invention is applicable to vehicles other than motorcycles, such as a three-wheeled or four-wheeled vehicle.

REFERENCE SIGNS LIST

1 Motorcycle (saddled vehicle)
20 Fog light unit
21 Base
22 Light section
32 Light emitting portion
34 Engaging portion
35 Lock pin
44 Guide rail
46 Engagement hole
51 Cover
55 First terminal (terminal)
56 Second terminal (terminal)
57 Third terminal (terminal)
60 Slide mechanism
90 Vehicle body battery
97 Vehicle body switch
102 Built-in battery

What is claimed is:

1. A fog light unit to be attached to a saddled vehicle, comprising:
   a base fixed to a vicinity of an external member of the saddle vehicle and a light section that is detachable from the base;
   the light section having a built-in battery;
   a slide mechanism connecting the base and the light section, the slide mechanism including:
      a guide rail; and
      an engaging portion that slides along the guide rail for engagement; and a lock mechanism configured to prohibit a slide motion of the slide mechanism, the lock mechanism including:
a lock pin that protrudes and retracts;
an engagement hole, with which the lock pin engages;
a key; and
a key cylinder rotatable with the key, the key cylinder connected to an operation mechanism of the lock pin, and disposed on a vehicle lateral side face of the base.

2. The fog light unit according to claim 1, further comprising terminals for the light section that lead to the built-in battery and a controller that the light section includes, and terminals for the base disposed at the base, wherein
wherein engagement between the guide rail and the engaging portion brings the terminals for the light section in contact with the terminals for the base.

3. The fog light unit according to claim 2, wherein the light section includes a switch to switch on and off a light emitting portion.

4. The fog light unit according to claim 2, further comprising a cover that covers the slide mechanism after the light section is detached from the base.

5. The fog light unit according to claim 2, wherein the built-in battery of the light section is configured to be charged by power supply from a vehicle body battery when the light section is attached to the base, and
wherein charging voltage is lowered when a charge rate of the built-in battery exceeds a predetermined value.

6. The fog light unit according to claim 2, wherein the lock pin is disposed at any of the light section and the base, and
wherein the lock pin is located outside a region surrounded by the terminals for light section or outside a region surrounded by the terminals for the base.

7. The fog light unit according to claim 6, wherein the light section includes a switch to switch on and off a light emitting portion.

8. The fog light unit according to claim 6, further comprising a cover that covers the slide mechanism after the light section is detached from the base.

9. The fog light unit according to claim 6, wherein the built-in battery of the light section is configured to be charged by power supply from a vehicle body battery when the light section is attached to the base, and
wherein charging voltage is lowered when a charge rate of the built-in battery exceeds a predetermined value.

10. The fog light unit according to claim 1, wherein the light section includes a switch to switch on and off a light emitting portion.

11. The fog light unit according to claim 10, wherein while the light section is connected to the base, the vehicle body of the saddle vehicle has priority for lighting control of the light section.

12. The fog light unit according to claim 11, further comprising a cover that covers the slide mechanism after the light section is detached from the base.

13. The fog light unit according to claim 10, further comprising a cover that covers the slide mechanism after the light section is detached from the base.

14. The fog light unit according to claim 10, wherein the built-in battery of the light section is configured to be charged by power supply from a vehicle body battery when the light section is attached to the base, and
wherein charging voltage is lowered when a charge rate of the built-in battery exceeds a predetermined value.

15. The fog light unit according to claim 1, further comprising a cover that covers the slide mechanism after the light section is detached from the base.

16. The fog light unit according to claim 1, wherein the built-in battery of the light section is configured to be charged by power supply from a vehicle body battery when the light section is attached to the base, and
wherein charging voltage is lowered when a charge rate of the built-in battery exceeds a predetermined value.

17. The fog light unit according to claim 1, further comprising:
a guard pipe protecting a body of the saddled vehicle extending across a front cowl of the saddled vehicle toward a lateral side,
wherein the base hangs on the guard pipe.

* * * * *